United States Patent [19]

Dills

[11] Patent Number: 4,512,462
[45] Date of Patent: Apr. 23, 1985

[54] ADHESIVE TAPE TAB

[76] Inventor: Reuben H. Dills, P.O. Box 12451, Seattle, Wash. 98111

[21] Appl. No.: 654,960

[22] Filed: Sep. 26, 1984

[51] Int. Cl.³ ............................................. B65D 85/67
[52] U.S. Cl. ...................................... 206/53; 206/389; 206/411; 225/90; 242/1; 242/74
[58] Field of Search ................. 206/53, 411, 410, 389; 242/1, 74; 225/90

[56] References Cited

U.S. PATENT DOCUMENTS

| 2,295,477 | 9/1942 | Jackson | 225/90 |
| 2,329,527 | 9/1943 | Golub | 206/411 |
| 2,630,385 | 3/1953 | Wolff | 206/389 |
| 2,732,063 | 1/1956 | Dedek et al. | 206/410 |
| 3,022,170 | 2/1962 | Flinchbaugh et al. | 242/74 |
| 3,190,443 | 6/1965 | Kingsley | 206/389 |
| 3,195,722 | 7/1965 | Duden | 206/53 |
| 3,247,956 | 4/1966 | Rosen | 242/1 |
| 3,537,578 | 11/1970 | Figliuzzi | 242/1 |

FOREIGN PATENT DOCUMENTS

| 610542 | 12/1960 | Canada | 225/90 |
| 659615 | 10/1951 | United Kingdom | 206/411 |

Primary Examiner—William T. Dixson, Jr.
Attorney, Agent, or Firm—Seed and Berry

[57] ABSTRACT

A reusable tape tab marks the exposed end of a roll of tape. The tab comprises a sheet of non-porous, moisture-resistant, adhesive-free material which is adherable to the exposed end of the tape when the tape is stored between use. The tab is removable from the end of the tape and is reusable.

13 Claims, 3 Drawing Figures

U.S. Patent    Apr. 23, 1985    4,512,462
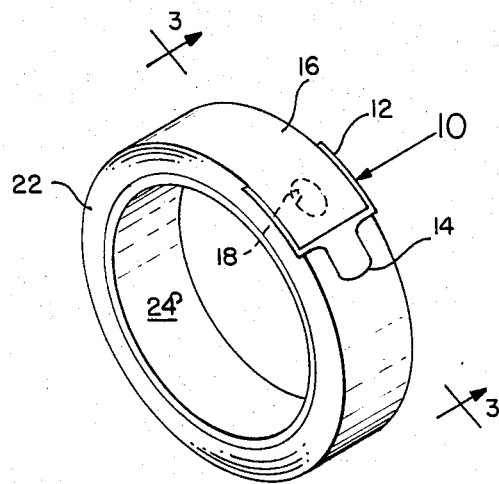
FIG. 1
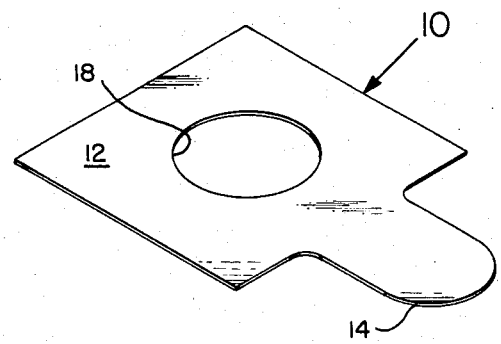
FIG. 2
FIG. 3
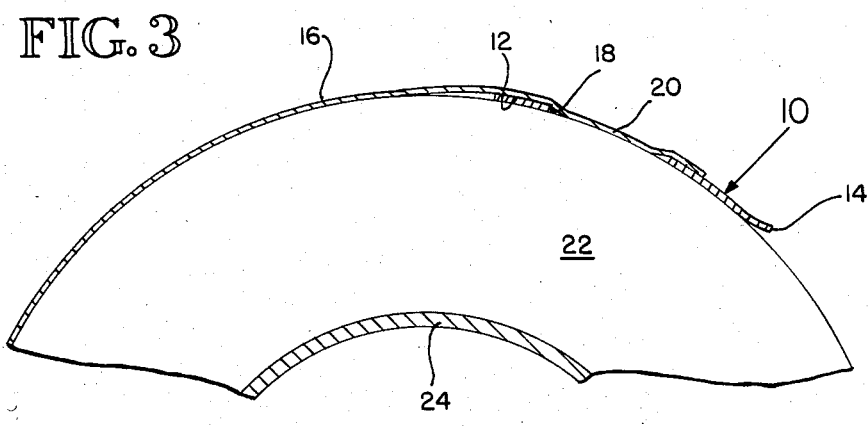

4,512,462

ADHESIVE TAPE TAB

DESCRIPTION

1. Technical Field

This invention relates to a tab for marking the end of a roll of adhesive tape during storage of the tape.

2. Background Art

Finding the end of a stored roll of tape is often a frustrating and time-consuming activity when the end is stuck to the roll. The problem is compounded for clear cellophone tapes, such as SCOTCH ®-brand tapes, where the end of the tape is almost indiscernible. Even when the end is located, it is often difficult to start the tape across the full web, and significant amounts of tape may be wasted.

While it is possible to store the tape in a suitable dispenser, not all tapes have dispensers. Also, in tool boxes and the like, the space limitations will not allow use of dispensers.

New rolls of tape, even rolls designed for dispensers, often come with an end-of-roll marker for the replacement roll. Such a marker, however, is not reusable and must be removed from the tape prior to its use. Generally, this end marker is a piece of paper which is adhered to the tape to mark the end. Such a marker is permanently adhered to the tape and destroys that portion to which it is adhered.

In U.S. Pat. No. 2,329,527, Golub discloses a method for manufacturing rolls of gummed tape which includes a sealing strip adhered to the tape to mark the end. This sealing strip is used in the same fashion as the paper end marker for replacement rolls of tape. The tape is rolled with the gummed portion of the tape exposed. The sealing strip is moistened so that it adheres permanently between a small portion of the end and the underlying roll of the tape. This sealing strip is a piece of blotting paper or the like which contacts the gummed surface of the roll, an intermediate layer of comparatively weak adhesive, and an upper layer of comparatively stiff paper of different characteristics and greater strength than the blotting paper. The upper layer has an outer gummed surface which is adapted to adhere to the roll. In use, the sealing strip easily tears or splits when pulled sharply to release the end of the tape.

In U.S. Pat. No. 2,015,268, Hammond discloses a method and apparatus for securing the end of gummed tape. The end marker includes an adhesive side which is permanently stuck to the outer surface of the roll of tape. The upper surface of the end marker includes waxed spots on paper. When the tape is moistened, the gummed surface of the tape will adhere to the paper of the marker, but not to the wax. To start the roll of gummed tape, the free end is pulled sharply to tear the sealing strip, leaving a portion permanently stuck to the outer surface of the roll and a paper portion on the gummed underside of the tape.

In U.S. Pat. No. 2,119,163, Hermann discloses a roll of adhesive tape including detachable foil discs of substantially the same size as the side of the roll. These discs are adhered to the edges of the tape and protect the adhesive on the tape from moisture and air. These moisture-resistant foils improve the life of the tape.

Nothing in the prior art suggests a reusable marker for the end of a tape during storage of the tape.

DISCLOSURE OF THE INVENTION

The present invention relates to a reusable tape tab to mark the exposed end of a roll of tape, comprising a sheet of non-porous, moisture-resistant, adhesive-free material which is adherable to the exposed end of the tape on the adhesive side of the tape to mark the end. The tab is removable from the end of the tape and is reusable. Usually the tab includes at least one opening so that, when the tab is positioned on the end of the tape, an adhesive area of the tape projects through the opening to allow the end of the tape to be readhered to the roll with the tab in place. The tab may include a grasping portion having a different width than the width of the tape to ease finding the tab. Generally, the tab has a rigidity at least slightly greater than the tape to facilitate separation of the tape and tab. Preferably the tab is made from a material, such as plastic or coated paper, which is removable from the end of the tape without substantially reducing the adhesive quality of the contacted tape.

The invention also relates to a method for marking the end of a roll of tape between uses of the tape so that the end can be found easily. This method comprises the steps of adhereing a sheet of non-porous, moisture-resistant, adhesive-free material to the end of the tape on the adhesive side of the tape to temporarily mark the end. This sheet is removable from the end and is reusable. Upon removal of the tab, the tape end is still adhesive and still may be used.

BRIEF DESCRIPTION OF THE DRAWINGS

FIG. 1 is an isometric view of a roll of tape using the tab of the present invention.

FIG. 2 is an isometric view of a preferred tab of the present invention.

FIG. 3 is a sectional view taken along line 3—3 of FIG. 1.

BEST MODE FOR CARRYING OUT THE INVENTION

For purposes of this description, the term "adhesive tape" is used in its most general sense, describing a tape having a film with at least one side coated with an adhesive. The term should not be limited to medical tape having a cloth layer and a coating of adhesive on one side, unless the context clearly indicates that the medical tape is intended.

A reusable adhesive tape tab 10 of the present invention generally comprises a sheet of plastic (such as polyethlyene, polypropylene, or acetate) or coated paper having a tape contacting portion 12 and a grasping portion 14. This material is non-porous, essentially moisture-resistant, and adhesive free. The tape contacting portion 12 is generally rectangular, having a width substantially equal to the width of the tape 16. The grasping portion 14 of the tab 10 generally is a neckdown portion which extends outwardly from the end of the tape when the tab is properly positioned. The contacting portion and grasping portion 14 may be of different materials, if desired. At least one opening 18 is generally fashioned into the tape contacting portion 12 of the tab 10 so that, when the tab 10 is positioned on the end of the roll of tape 16, a portion of the tape 20 projects through the opening 18 and is readhered to the remainder of the roll 22, as shown in FIG. 3.

A plurality of layers of the tape are wound on a spool 24 to form the roll 22. Usually, adhesive is only placed on one side of the tape. The tab 10 of the present invention is used to mark the outer end of a roll 22 between uses of the tape.

It is preferred that the tab 10 be made of a material which may be adhered to the tape end, but is removable from the end to leave the tape with a significant amount of its adhesive ability. The tab 10 includes the opening 18 so that the tab may be stuck to the roll of tape and so that the tape 10 does not act as a weight to draw tape from the roller. When properly positioned as shown in FIGS. 1 and 3, the end of the tape is distinctively marked so that there is no problem in identifying the end. In this manner, a roll 22 of tape can be stored without a dispenser for a significant period of time without worry. The end of the tape will be readily identifiable upon locating the tape. Little or no time will be wasted in searching for the end, and little or no tape will be wasted by removing the tab 10. The reusable tab of the present invention may be repositioned for storing the tape once again, after the desired amount of tape is withdrawn.

The tab 10 generally is a sheet of rigid polyethylene or other plastic having a thickness of about 1/32 inch, thereby being much more rigid than the tape.

Of course, a plurality of openings may be used rather than the one, circular opening 18 which is shown or the opening can be eliminated.

While a preferred embodiment of the invention has been shown and described, those skilled in the art will readily recognize alterations and modifications which may be made to the invention without departing from its inventive concept. Therefore, this description and the accompanying drawings are meant to illustrate the invention rather than to limit it. The claims should be construed liberally in view of this description and should be limited only as is necessary in view of the pertinent prior art.

I claim:

1. A reusable tab to mark the exposed end of a roll of tape comprising a sheet of nonporous moisture-resistant, adhesive-free material which is adherable to the exposed end of the tape on the adhesive side of the tape to mark the end of the tape when the tape is stored between uses, the tab being removable from the end of the tape and being reusable.

2. The tab of claim 1 wherein the sheet includes at least one opening positioned so that, when the tab is on the end of the tape, an adhesive area of the tape projects through the opening to allow the end to be readhered to the roll with the tab in place.

3. The tab of claim 1 wherein the sheet includes a tape contacting portion and a grasping portion, the grasping portion having a width different from the width of the tape to which the tab is adhered.

4. The tab of claim 3 wherein the grasping portion is necked down from the width of the tape contacting portion.

5. The tab of claim 3 wherein the tape contacting portion includes at least one opening positioned so that, when the tab is on the end of the tape, an adhesive area projects through the opening to allow the end to be readhered to the roll with the tab in place.

6. The tab of claim 1 wherein the sheet has a rigidity at least slightly greater than the tape to facilitate separation of the tab and tape.

7. The tab of claim 6 wherein the sheet has a tape contacting portion slightly less than the width of the tape.

8. The tab of claim 6 wherein the material is separable from the tape end so as not to substantially reduce the adhesive ability of the tape in the area of contact between the material and the tape.

9. The tab of claim 8 wherein the sheet is plastic.

10. The tab of claim 9 wherein the sheet includes at least one opening positioned so that, when the tab is positioned on the tape, an adhesive area on the tape projects through the opening to allow the end of the tape to be readhered to the roll with the tab in place.

11. The tab of claim 10 wherein the sheet has a tape contacting portion and a grasping portion, the tape contacting portion having the opening, the grasping portion having a width different from the tape contacting portion to facilitate grasping when the tab is positioned on the tape.

12. A method for marking the end of a roll of tape between uses of the tape so that the end can be found easily, comprising the step of adhering a sheet of nonporous, moisture-resistant adhesive-free material to the end of the tape on the adhesive side to temporarily mark the end of the tape, the sheet being removable from the end and being reusable, the removal leaving the tape with an end and still having adhesive for use.

13. The process of claim 12 wherein the tab includes at least one opening which is positioned so that an adhesive portion of the tape projects through the opening so that the tape can be readhered to the roll with the tab in place.

* * * * *